(12) United States Patent
Shimozaki

(10) Patent No.: US 6,941,564 B2
(45) Date of Patent: Sep. 6, 2005

(54) DISK INSERTION, BIASING AND ALIGNMENT APPARATUS

(75) Inventor: Mitsuhiro Shimozaki, Gunma (JP)

(73) Assignee: Shinwa Kabushiki Kaisha, Tokyo (JP)

( * ) Notice: Subject to any disclaimer, the term of this patent is extended or adjusted under 35 U.S.C. 154(b) by 170 days.

(21) Appl. No.: 10/375,417

(22) Filed: Feb. 27, 2003

(65) Prior Publication Data

US 2003/0165104 A1 Sep. 4, 2003

(30) Foreign Application Priority Data

Feb. 27, 2002 (JP) ........................................ 2002-051962

(51) Int. Cl.[7] ............................................. G11B 17/04
(52) U.S. Cl. ..................................................... 720/620
(58) Field of Search .............................. 720/620, 624, 720/633; 369/77.1, 77.2, 75.1, 75.2

(56) References Cited

U.S. PATENT DOCUMENTS

| | | | |
|---|---|---|---|
| 4,470,136 A | * | 9/1984 | Takahashi et al. ......... 369/77.1 |
| 5,204,849 A | | 4/1993 | Yamada et al. |
| 5,774,442 A | * | 6/1998 | Nakamichi ................. 369/75.2 |
| 6,222,810 B1 | | 4/2001 | Kang et al. |
| 6,288,982 B1 | * | 9/2001 | Kato ........................ 369/30.36 |
| 2001/0053116 A1 | | 12/2001 | Sato |

FOREIGN PATENT DOCUMENTS

| | | |
|---|---|---|
| JP | 10-116459 | 5/1998 |
| JP | 11-110875 | 4/1999 |

* cited by examiner

*Primary Examiner*—David Davis
(74) *Attorney, Agent, or Firm*—Dennis G. LaPointe

(57) ABSTRACT

A disk insertion position setting device that can be compactly arranged. First and second sliding members 31 and 32, with disk contacting parts 39 and 41, are provided in a manner enabling sliding in directions that intersect a central line O of a disk insertion direction F. Sliding members 31 and 32 are urged by a spring 33 in directions in which disk contacting parts 39 and 41 approach central line O. A rotating member 34 is disposed in a rotatable manner between sliding members 31 and 32. By means of rotating member 34, the sliding of sliding members 31 and 32 in synchronization in mutually opposite directions is allowed and the sliding of just one of either sliding member 31 or 32 alone is restricted. A compact arrangement is realized by the use of sliding members 31 and 32 that slide in directions that intersect central line O.

9 Claims, 8 Drawing Sheets

DISK INSERTION, BIASING AND ALIGNMENT APPARATUS

BACKGROUND OF THE INVENTION

This invention relates to a disk insertion position setting device for positioning a disk so that it will be inserted along a central line of a disk insertion direction.

Since priorly, disk players, such as disk players for compact disks for music reproduction, etc., have been equipped with a disk insertion position setting device, such as that disclosed for example in Japanese Unexamined Patent Publication No. Hei 10-116459. When a loading method, whereby a disk is inserted into and ejected from a disk insertion entrance on the front face of the disk player, is employed, this disk insertion position setting device positions the disk so that it will be inserted along a central line of a disk insertion direction even when the disk tends to be inserted in a manner that is biased towards one side of the central line of the disk insertion direction.

With this disk insertion position setting device, rotary arms, respectively having disk contacting parts positioned at the respective sides of the disk insertion entrance, are disposed in a rotatable manner, and the ends at one side of connecting members are connected respectively to the respective rotary arms, the other ends of the respective connecting members are connected together with a pin, and this pin is engaged in a guide groove provided in a chassis so that the rotary arms will swing in synchronization. The respective ends of the guide groove are provided with indented parts, each of which catches the pin when the pin is pushed to one side.

When a disk is inserted along the central line of the disk insertion entrance, the disk contacting parts at both sides are pushed by the disk and move spreadingly in synchronization, the rotary arms at both sides rotate in synchronization, and, due to the respective connecting members, the pin is moved along the center of the guide groove without becoming caught by either of the indented parts. When the disk is inserted in a manner that is biased towards one side with respect to the central line of the disk insertion entrance, only the disk contacting part at the side towards which the disk is biased is pushed by the disk and moves spreadingly, only the rotary arm at one side rotates, and the pin is pushed towards a side of the guide groove by the connecting member at one side and is caught by the indented part. The spreading movement of the disk contacting part at one side is thus restricted and the insertion of the disk is shifted towards the other side, thereby correcting the insertion so that it will proceed along the central line of the disk insertion entrance.

SUMMARY OF THE INVENTION

However, since the prior-art disk insertion position setting device has the structure wherein rotary arms having disk contacting parts undergo rotational movement, the length between a disk contacting part and the turning point of the rotary arm must be made somewhat large in order to secure the movement amount by which the disk contacting part undergoes the spreading movement upon being pushed by the disk. This causes the rotary arm to be large and also causes the connecting members for making the rotary arms at both sides swing in synchronization to be large.

This invention has been made in view of such points and an object thereof is to provide a disk insertion position setting device that can be arranged compactly.

The invention provides a disk insertion position setting device comprising: a first sliding member, slidable in directions intersecting a central line of a disk insertion direction and having, at one side with respect to the abovementioned central line, a disk contacting part contacting one peripheral side of a disk that is inserted in the disk insertion direction; a second sliding member, slidable in directions intersecting the central line of the abovementioned disk insertion direction and having, at the other side with respect to the abovementioned central line, a disk contacting part contacting the other peripheral side of the disk that is inserted in the disk insertion direction; an urging means, urging the abovementioned first and second sliding members in directions in which the respective disk contacting parts approach the abovementioned central line; and a restricting means, allowing the respective disk contacting parts of the abovementioned first and second sliding members to synchronously move spreadingly with respect to the central line when the disk is inserted along the abovementioned central line and, when the disk is inserted in a manner that is biased towards either side of the abovementioned central line, restricting the spreading movement, with respect to the central line, of the disk contacting part at the side towards which the disk is biased and aligning the disk along the central line.

With this arrangement, when a disk is inserted along the central line, the respective disk contacting parts of the first and second sliding members synchronously move spreadingly with respect to the central line, and when a disk is inserted in a manner that is biased to either side of the central line, the spreading movement, with respect to the central line, of the disk contacting part at the side towards which the disk is biased is restricted and the disk is aligned along the central line. Since the disk can be positioned so as to be inserted along the central line of the disk insertion direction by the use of the first and second sliding members that slide in directions intersecting the central line of the disk insertion direction, the device can be arranged compactly.

The invention provides a disk insertion setting device, wherein the restricting means comprises a first and second sliding member; and a rotating member, being disposed in a rotatable manner between said first and second sliding member, allowing the sliding of the first and second sliding members in synchronization in mutually opposite directions, and restricting the sliding of just one of the sliding members alone.

With this arrangement, the disk can be positioned so as to be inserted along the central line of the disk insertion direction by a simple arrangement only using the first and second sliding members and the rotating member as the restricting means.

The invention provides a disk insertion position setting device comprising: a first sliding member, having a sliding part, slidable in directions intersecting a central line of a disk insertion direction, and a disk contacting part, being provided at one side of this sliding part and contacting one peripheral side of a disk that is inserted in the disk insertion direction; a second sliding member, having a sliding part, slidable parallel to the sliding part of the first sliding member and in directions intersecting the central line of the abovementioned disk insertion direction, and a disk contacting part, being provided at the other side of this sliding part and contacting the other peripheral side of the disk that is inserted in the disk insertion direction; an urging means, urging the abovementioned first and second sliding members in directions in which the respective disk contacting parts approach the abovementioned central line; and a rotating member, disposed in a rotatable manner between the sliding parts of the abovementioned first and second sliding member, allowing the sliding of the first and second sliding members in synchronization in mutually opposite directions, and restricting the sliding of just one of the sliding members alone.

With this arrangement, when a disk is inserted along the central line, the respective sliding members are allow to slide in synchronization in mutually opposite directions, and when a disk is inserted in a manner that is biased towards either side of the central line, the sliding of just one of the sliding members alone is restricted and the disk is aligned along the central line. Since the disk can be positioned so as to be inserted along the central line of the disk insertion direction by disposing in parallel the sliding parts of the first and second sliding members, which slide in directions intersecting the central line of the disk insertion direction, and by providing, between these sliding parts, a rotating member that allows the sliding of the first and second sliding members in synchronization in mutually opposite directions and restricts the sliding of just one of the sliding members alone, the device can be made few in the number of parts, simple in arrangement, and arranged in compact.

The invention provides the disk insertion position setting device, wherein a pair of gear parts and a pair of notched parts are provided on the circumferential face of the rotating member; and a first rack part, a rotation restricting part, and a second rack part are disposed in that order along each of the mutually opposing edge parts of the respective sliding parts of the first and second sliding members in a point symmetrical positional relationship centered about the rotating member, the interval across which the rotation restricting parts oppose each other being set narrower than the outer diameter of the pair of gear parts on the rotating member and yet wider than the interval of the pair of notched parts, the sliding of the respective sliding members being synchronized at rotation positions of the rotating member at which the respective rack parts engage with the respective gear parts, and the rotation of the rotating member being restricted and the sliding of the respective sliding members being allowed at rotation positions of the rotating member at which the respective rotation restricting parts oppose the respective notched parts.

With this arrangement, in the case where the first and second sliding members slide in synchronization in mutually opposite directions, since the respective rack parts engage with the respective gear parts of the rotating member when the rotating member is at a rotation position at which the respective rotation restricting parts of the respective sliding members face the respective notched parts of the rotating member, the rotating member rotates and the respective sliding members slide together. Meanwhile, in the case where just one of the sliding members slides, even if the rack part of the one sliding member that slides engages with the gear part of the rotating member when the rotating member is at a rotation position at which the respective rotation restricting parts face the respective notched parts, the rotation of the rotating member is restricted by the rotation restricting part of the other sliding member that does not slide, thereby restricting the sliding of the one sliding member. A disk can thus be positioned so that it will be inserted along the central line of the disk insertion direction by a simple arrangement.

The invention provides the disk insertion position setting device, wherein in the condition where a disk is not in contact with the respective disk contacting parts, the respective gear parts of the rotating member engage with the respective first rack parts, and when the abovementioned first and second sliding members slide in synchronization in mutually opposite directions, the rotation of the rotating member, in the process of which the respective gear parts disengage from the respective first rack parts, the respective notched parts oppose the respective rotation restricting parts, and the respective gear parts engage with the respective second rack parts, is allowed, and when just one of the sliding members slides, the gear part that disengages from the first rack part of the one sliding member contacts the rotation restricting part of the other sliding member to restrict the rotation of the rotating member and the gear part that disengages from the first rack part of the other sliding member contacts the second rack part of the one sliding member to restrict the sliding of the one sliding member.

With this arrangement, when the first and second sliding members slide in synchronization in mutually opposite directions, the rotation of the rotating member, in the process of which the respective gear parts of the rotating member become disengaged from the respective first rack parts, the respective notched parts face the respective rotation restricting parts, and the respective gear parts engage with the respective second rack parts, is allowed. Meanwhile, when just one of the sliding members slides, the gear part that has disengaged from the first rack part of the one sliding member contacts the rotation restricting part of the other sliding member, thereby restricting the rotation of the rotating member and the gear part that has disengaged from the first rack part of the other sliding member contacts the second rack part of the one sliding member, thereby restricting the sliding of the one sliding member. A disk can thus be positioned so that it will be inserted along the central line of the disk insertion direction by a simple arrangement.

The invention provides the disk insertion position setting device, wherein the length of the rotation restricting part between the first rack part and the second rack part is set longer than the length of the notched part from one gear part to the other gear part of the rotating member.

With this arrangement, since the length of the rotation restricting part between the first rack part and the second rack part is set longer than the length of the notched part from one gear part to the other gear part of the rotating member, when just one of the sliding member slides, the gear part that has disengaged from the first rack part of the one sliding member contacts the rotation restricting part of the other sliding member without fail, thereby enabling restriction of the rotation of the rotating member and restriction of the sliding of just the one sliding member.

The invention provides the disk insertion position setting device, having a case wherein the first and second sliding members are slidably provided and the rotating member is rotatably provided.

With this arrangement, the first and second sliding members and the rotating member can be assembled integrally to the case, thereby improving assembly efficiency.

The invention provides the disk insertion position setting device, wherein a plurality of guide protrusions are formed on the first and second sliding members and protrude therefrom; and a plurality of guide grooves, which slidably engage with each guide protrusion of the first and second sliding members, are provided in the case.

With this arrangement, sliding of the first and second sliding members can be guided by the guide grooves in the case.

The invention provides the disk insertion position setting device, wherein the urging means is a spring the intermediate part of which is wounded in a coil-like form, has the respective end parts respectively connected to the first and second sliding members, and urges the first and second sliding members in directions in which the respective disk contacting parts approach the central line.

With this arrangement, the first and second sliding members can be urged securely in directions in which the respective disk contacting parts approach the central line.

DETAILED DESCRIPTION OF THE PREFERRED EMBODIMENT

An embodiment of this invention shall now be described with reference to the drawings.

A disk to be handled with a disk player to which a disk insertion position setting device of the embodiment is applied is, for example, a compact disk for music reproduction, and in the following description, a large-diameter album type disk DL with a diameter of 12 cm and a single type small-diameter disk DS with a diameter of 8 cm shall be used as examples.

Figure 4:
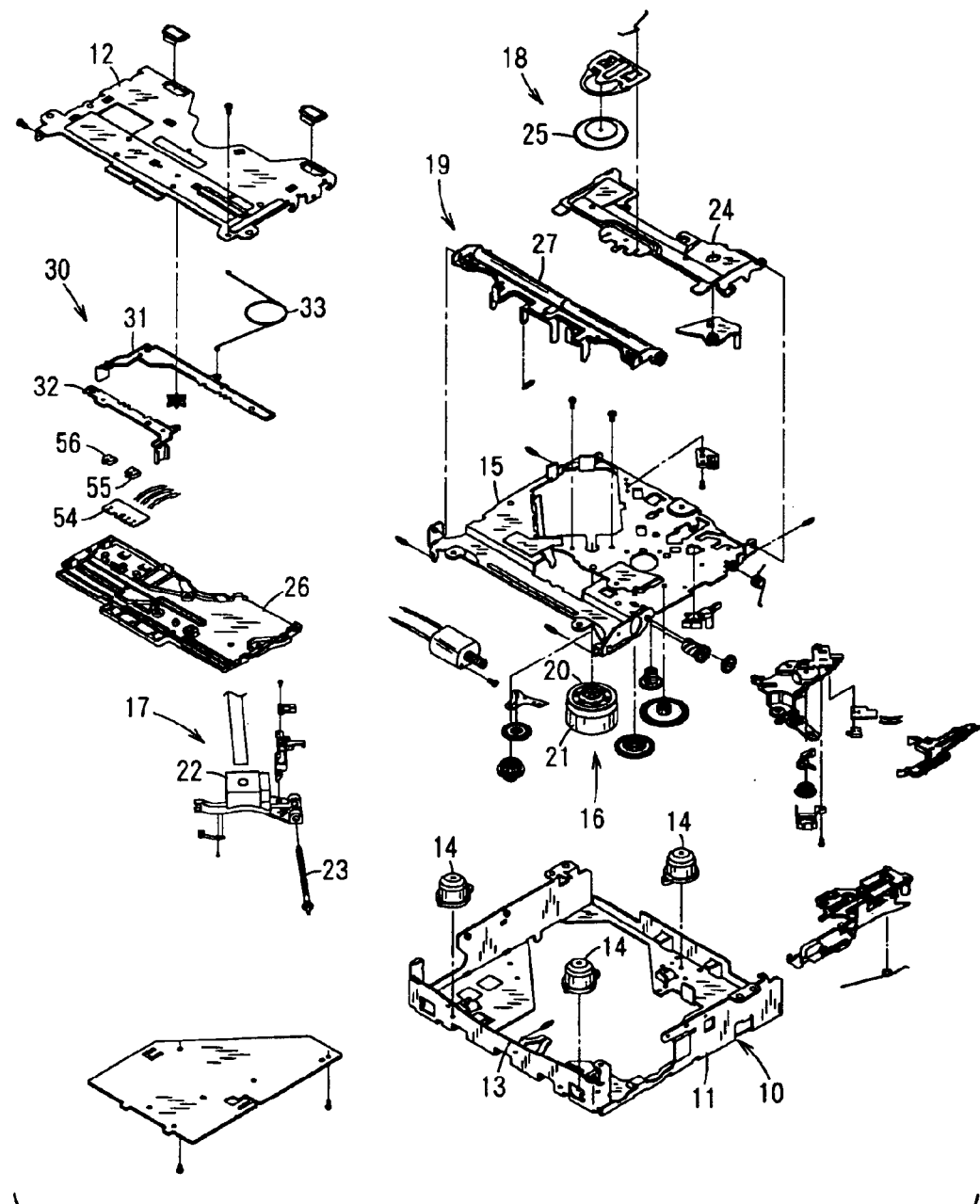
FIG. 4 is an exploded perspective view of the same disk player.

FIG. 4 is an exploded perspective view of a disk player with a main body 10. This main body 10 has a chassis 11 and a top plate 12, which is mounted to the upper face of chassis 11, and a disk insertion entrance 13, for insertion and ejection of a disk, is formed on the front face of chassis 11.

At the inner side of chassis 11, a pick base 15 is supported in a floating manner by a plurality of dampers 14. On this pick base 15 are disposed a disk rotation mechanism 16, which rotates a disk that has been set at a reproduction position on pick base 15, a pickup mechanism 17, which optically reads the information stored in the disk, a chucking mechanism 18, which chucks the disk, a part of a loading mechanism 19, which loads the disk, etc.

Disk rotation mechanism 16 has a turntable 20, which is set in a rotatable manner at the reproduction position on pick base 15, and a spindle motor 21, which rotatingly drives this turntable 20.

Pickup mechanism 17 has a pickup 22, which optically reads the information stored in the disk, and a pickup moving mechanism 23, which moves this pickup 22 in the radial direction of the disk.

Disk chucking mechanism 18 has a chucking arm 24, which is disposed at the rear side of pick base 15, and a damper 25, which chucks the disk, is mounted in a rotatable manner between the center of the front end of chucking arm 24 and turntable 20.

Disk loading mechanism 19 has a top guide 26, which is disposed at the upper side of disk insertion entrance 13 and is mounted to the bottom face of top plate 12, and a loading roller 27, which is disposed at the lower side of disk insertion entrance 13 and sandwiches the disk between top guide 26 and conveys the disk in disk conveying directions that include the loading direction and unloading direction.

Figure 1:
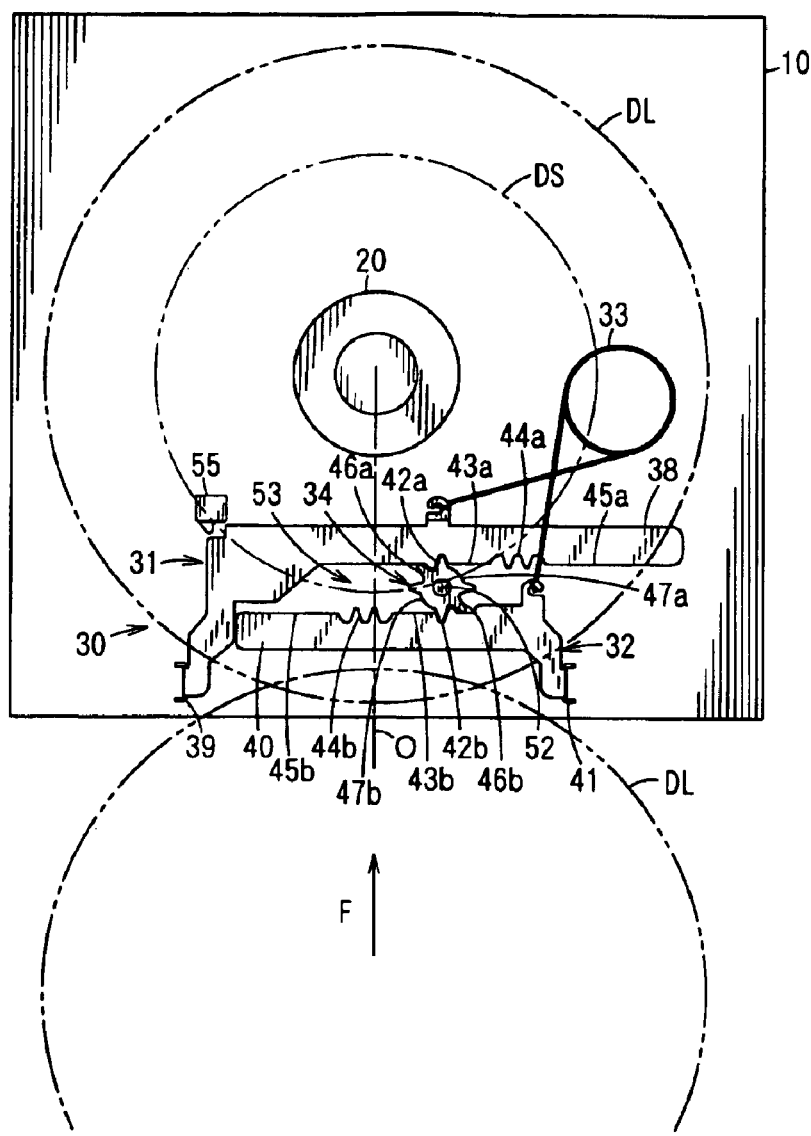
FIG. 1 is a schematic plan view of a disk player to which a disk insertion position setting device of an embodiment of this invention has been applied.
Figure 2:
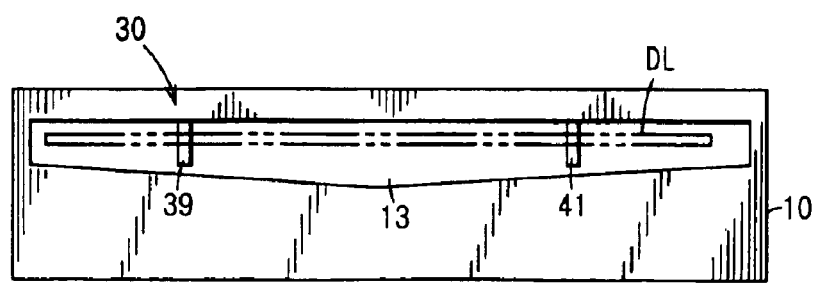
FIG. 2 is a schematic front view of the same disk player.
Figure 3:
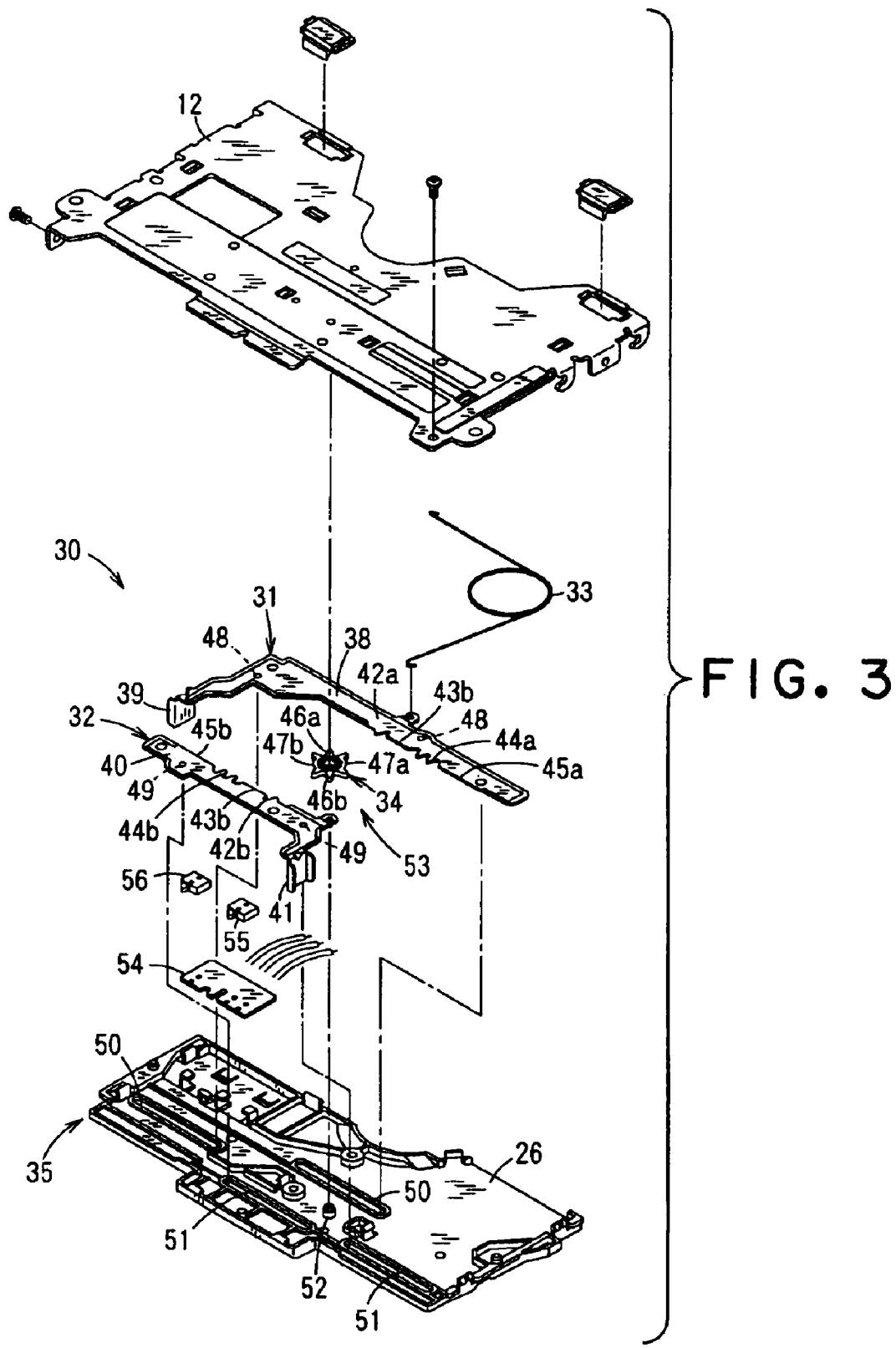
FIG. 3 is an exploded perspective view of the same disk insertion position setting device.

Also, as shown in FIGS. 1 through 3, at the top plate 12 side of main body 10 is disposed a disk insertion position setting device 30, which, when a disk is inserted into disk insertion entrance 13, positions the disk so that disk will be inserted along a central line O of a disk insertion direction F.

This disk insertion position setting device 30 has a first sliding member 31, a second sliding member 32, a spring 33, which serves as an urging means, and a rotating member 34, and also has a case 35, which comprises a top plate 12 and top guide 26 to which first sliding member 31, second sliding member 32, spring 33, and rotating member 34 are mounted.

First sliding member 31 is formed integrally of a metal plate, has a sliding part 38, which is mounted to case 35 in a manner enabling sliding in directions that intersect central line O of disk insertion direction F, and a disk contacting part 39, which protrudes to a position that is shifted to one side of central line O of disk insertion entrance 13, is provided on the one side of sliding part 38. The peripheral side at the one side of a disk that is inserted into disk insertion entrance 13 contacts disk contacting part 39.

Second sliding member 32 is formed integrally of a metal plate, has a sliding part 40, which is mounted to case 35 in a manner enabling sliding in directions that intersect central line O of disk insertion direction F, and a disk contacting part 41, which protrudes to a position that is shifted to the other side of central line O of disk insertion entrance 13, is provided on the other side-of sliding part 40. The peripheral side at the other side of the disk that is inserted into disk insertion entrance 13 contacts disk contacting part 41.

The respective sliding parts 38 and 40 of sliding members 31 and 32 are disposed in parallel, and along the mutually opposing edges of sliding parts 38 and 40, first rack parts 42a and 42b, rotation restricting parts 43a and 43b, second rack parts 44a and 44b, and rotation restricting parts 45a and 45b are provided in that order in a point symmetric positional relationship centered about rotating member 34. The interval across which rotation restricting parts 43a and 43b oppose each other and the interval across which rotation restricting parts 45a and 45b oppose each other are set narrower than the outer diameter of rotating member 34.

Spring 33 is formed of a spring wire material the intermediate part of which is wound in a coil-like form, has the respective end parts respectively connected to sliding parts 38 and 40 of sliding members 31 and 32, and urges sliding parts 38 and 40 in directions in which disk contacting parts 39 and 41 approach central line O.

Rotating member 34 is rotatably disposed between sliding parts 38 and 40 of sliding members 31 and 32 and has the functions of allowing sliding members 31 and 32 to slide in synchronization in mutually opposite directions and restricting the sliding of just one of either sliding member 31 or 32 alone. That is, a pair of gear parts 46a and 46b and a pair of notched parts 47a and 47b are formed at intersecting positions of the circumferential face of rotating member 34, the sliding of sliding members 31 and 32 is synchronized at rotation positions of rotating member 34 at which rack parts 42a, 42b, 44a, and 44b engage with gear parts 46a and 46b, and at rotation positions of rotating member 34 at which rotation restricting parts 43a and 43b oppose notched parts 47a and 47b, the rotation of rotating member 34 is restricted and the sliding of sliding members 31 and 32 in that condition is allowed. The width of each of the pair of notched parts 47a and 47b of rotating member 34 is made narrower than the interval across which rotation restricting parts 43a and 43b oppose each other, and the length of each of rotation restricting parts 43a and 43b between first rack parts 42a and 42b and second rack parts 44a and 44b is made longer than the length of each of notched parts 47a and 47b from one gear part 46a to the other gear part 46b of rotating member 34. In the condition where a disk is not in contact with disk contacting parts 39 and 41, gear parts 46a and 46b engage with first rack parts 42a and 42b.

On top guide 26 of case 35 are formed a plurality of guide grooves 50 and 51, which engage with a plurality of guide protrusions 48 and 49 provided on sliding parts 38 and 40 of sliding members 31 and 32 and guide the sliding members 31 and 32 in directions that intersect central line O of disk insertion direction F, and an axis part 52, which axially supports rotating member 34 in a manner enabling rotation. Top plate 12 is fitted on with sliding members 31 and 32, spring 33, rotating member 34, etc., being disposed on top guide 26, and sliding members 31 and 32 are slidably supported and rotating member 34 is rotatably supported between top plate 12 and top guide 26.

A restricting means 53, which allows disk contacting parts 39 and 41 of sliding members 31 and 32 to synchronously move spreadingly with respect to central line O when a disk is inserted along central line O and which, when a disk is inserted in a manner that is biased towards either side of central line O, restricts the spreading movement, with respect to central line O, of the disk contacting part 39 or 41 at the side towards which the disk is biased, is arranged from first rack parts 42a and 42b, rotation restricting parts 43a and 43b, and second rack parts 44a and 44b, provided on sliding members 31 and 32, and by rotating member 34, having gear parts 46a and 46b and notched parts 47a and 47b.

Also an insertion detection switch 55, which is turned on by first sliding member 31 when it slides when a disk is inserted, and a disk type detection switch 56, which is turned on by first sliding member 31 when it slides when a large-diameter disk DL is inserted, are disposed by means of a circuit board 54 on top guide 26.

The actions of disk insertion position setting device 30 shall now be described.

As shown in FIG. 1, in the standby condition prior to disk insertion, disk contacting parts 39 and 41 of both sliding members 31 and 32 are mutually brought closest to central line O by the urging of spring 33, and gear parts 46a and 46b of rotating member 34 are engaged with first rack parts 42a and 42b of sliding members 31 and 32. At this point, the interval between disk contacting parts 39 and 41 is smaller than the diameter of a small-diameter disk DS.

A case where a small-diameter disk DS is inserted in a manner that is biased to the left side shall now be described with reference to FIGS. 5 and 6.

Figure 5:
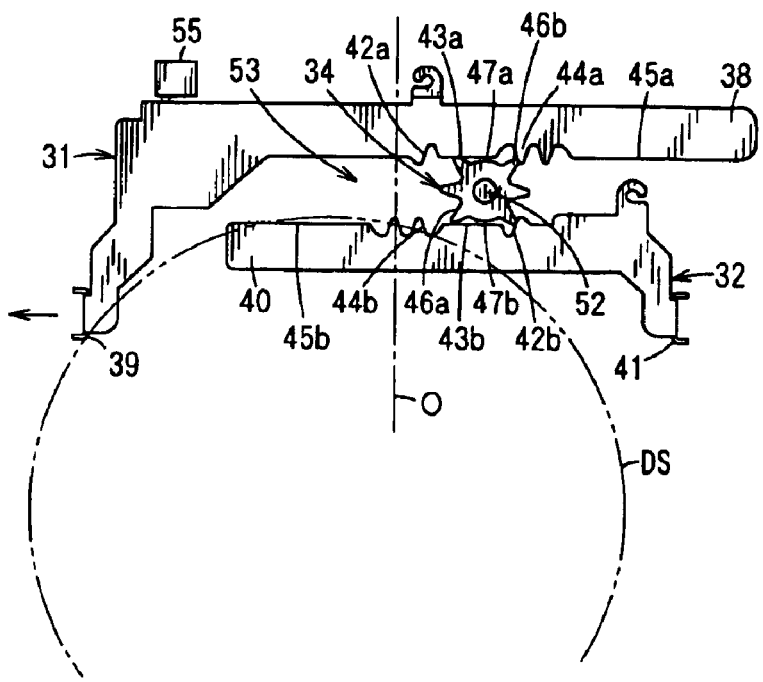
FIG. 5 is an explanatory diagram for explaining the actions when a small-diameter disk is inserted in a manner that is biased to the left side in the same disk insertion position setting device.

When small-diameter disk DS is inserted in a manner that is biased to the left side of FIG. 1, the left peripheral side of small-diameter disk DS contacts disk contacting part 39 of first sliding member 31 and pushes and causes first sliding member 31 to slide in the left direction as shown in FIG. 5.

By the sliding of first sliding member 31 in the left direction of FIG. 1, rotating member 34, with which one gear part 46a engages with first rack part 42a of first sliding member 31, rotates in the counterclockwise direction so that rotation restricting part 43a opposes notched part 47a, and by the counterclockwise rotation of rotating member 34, second sliding member 32, the first rack part 42b of which engages with the other gear part 46b, slides in a linked manner in the right direction so that rotation restricting part 43b opposes notched part 47b.

In the condition where rotation restricting parts 43a and 43b oppose notched parts 47a and 47b as shown in FIG. 5, first sliding member 31 slides further in the left direction and second rack part 44a contacts the other gear part 46b of rotating member 34 and tends to rotate rotating member 34 in the counterclockwise direction. However, the one gear part 46a that has disengaged from first rack part 42a of first sliding member 31 contacts rotation restricting part 43b of second sliding member 32 and restricts the rotation of rotating member 34 in the counterclockwise direction. The sliding of first sliding member 31 in the left direction is thus restricted. At the position at which the sliding in the left direction is restricted, the length between disk contacting part 39 of first sliding member 31 and central line O corresponds to approximately the radius of small-diameter disk DS.

After the sliding of first sliding member 31 in the left direction has been restricted in the condition shown in FIG. 5, the insertion of small-diameter disk DS is shifted to the right, that is, towards central line O.

Figure 6:
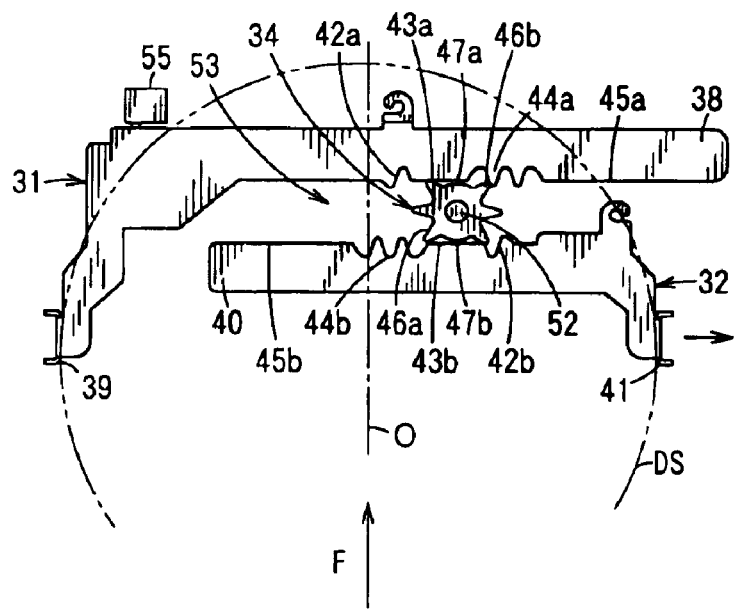
FIG. 6 is an explanatory diagram that follows after FIG. 5.

As shown in FIG. 6, when small-diameter disk DS is thus inserted with it being shifted towards central line O, the right peripheral side of small-diameter disk DS contacts disk contacting part 41 of second sliding member 32 and pushes and causes second sliding member 32 to slide in the right direction and small-diameter disk DS is thus aligned along central line O.

With it being aligned along central line O, small-diameter disk DS becomes sandwiched between top guide 26 and loading roller 27. When first sliding member 31 slides in the left direction, insertion detection switch 55 turns on, and since loading roller 27 is driven to rotate, small-diameter disk DS is loaded onto a predetermined reproduction position inside main body 10 by this rotation of loading roller 27.

When the maximum diameter part of small-diameter disk DS has passed between disk contacting parts 39 and 41, sliding members 31 and 32 are urged by spring 33 to slide so as to narrow the interval between disk contacting parts 39 and 41, and sliding members 31 and 32 slide in synchronization due to the engagement of gear parts 46a and 46b of rotating member 34 with first rack parts 42a and 42b, and the initial condition shown in FIG. 1 is thereby restored.

A case where small-diameter disk DS is inserted in a manner that is biased to the right side shall now be described with reference to FIGS. 7 and 8.

Figure 7:
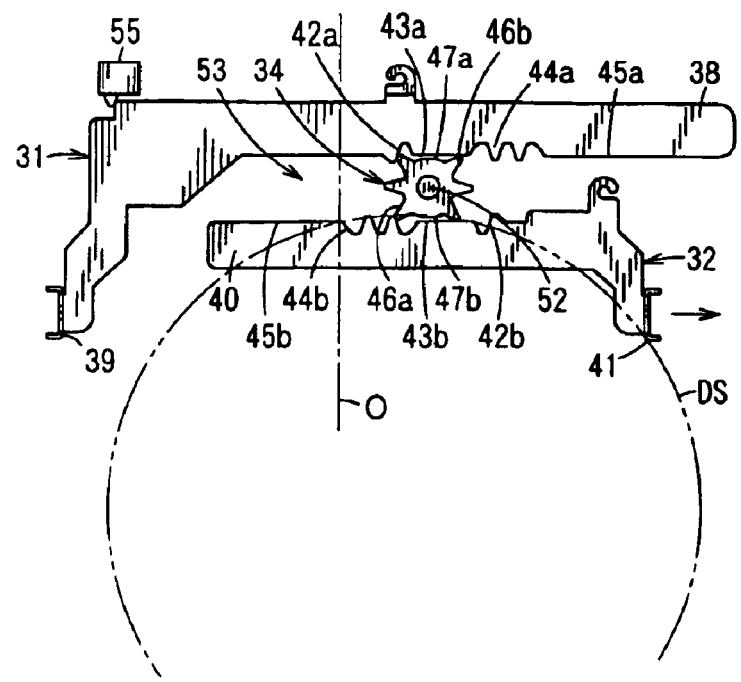
FIG. 7 is an explanatory diagram for explaining the actions when a small-diameter disk is inserted in a manner that is biased to the right side in the same disk insertion position setting device.

When small-diameter disk DS is inserted in a manner that is biased to the right side of FIG. 1, the right peripheral side of small-diameter disk DS contacts disk contacting part 41 of second sliding member 32 and pushes and causes second sliding member 32 to slide in the right direction as shown in FIG. 7.

By the sliding of second sliding member 32 in the right direction of FIG. 1, rotating member 34, with which one gear part 46b engages with first rack part 42b of second sliding member 32, rotates in the counterclockwise direction so that rotation restricting part 43b opposes notched part 47b, and by the counterclockwise rotation of rotating member 34, first sliding member 31, the first rack part 42a of which engages with the other gear part 46a, slides in a linked manner in the left direction so that rotation restricting part 43a opposes notched part 47a.

In the condition where rotation restricting parts 43a and 43b oppose notched parts 47a and 47b as shown in FIG. 7, second sliding member 32 slides further in the right direction and second rack part 44b contacts the other gear part 46a of rotating member 34 and tends to rotate rotating member 34 in the counterclockwise direction. However, the one gear part 46b that has disengaged from first rack part 42b of second sliding member 32 contacts rotation restricting part 43a of first sliding member 31 and restricts the rotation of rotating member 34 in the counterclockwise direction. The sliding of second sliding member 32 in the right direction is thus restricted. At the position at which the sliding in the right direction is restricted, the length between disk contacting part 41 of second sliding member 32 and central line O corresponds to approximately the radius of small-diameter disk DS.

After the sliding of second sliding member 32 in the right direction has been restricted in the condition shown in FIG. 7, the insertion of small-diameter disk DS is shifted to the left, that is, towards central line O.

Figure 8:
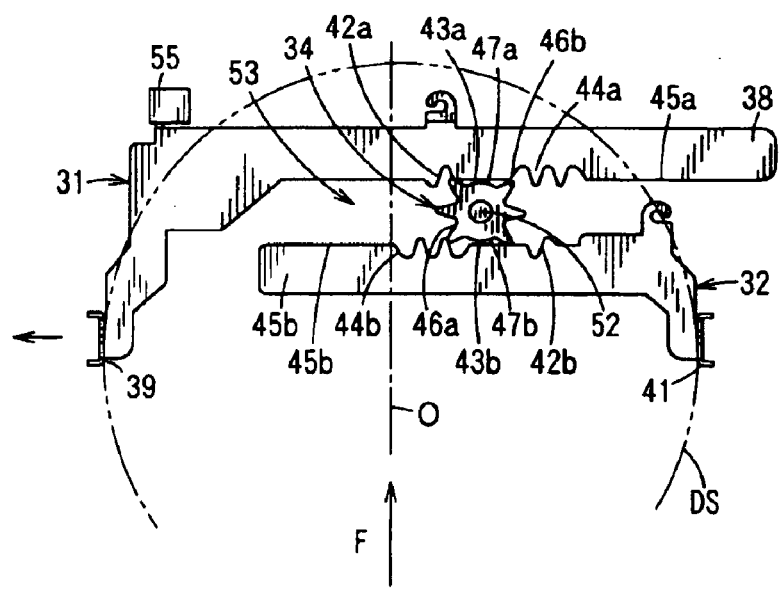
FIG. 8 is an explanatory diagram that follows after FIG. 7.

As shown in FIG. 8, when small-diameter disk DS is thus inserted with it being shifted towards central line O, the left peripheral side of small-diameter disk DS contacts disk contacting part 39 of first sliding member 31 and pushes and causes first sliding member 31 to slide in the left direction and small-diameter disk DS is thus aligned along central line O.

The subsequent actions are the same as those in the case where small-diameter disk DS is inserted in a manner that is biased to the left.

Also, in the case where small-diameter disk DS is inserted along central line O, since the peripheral sides of small-diameter disk DS contact both disk contacting parts 39 and 41 of sliding members 31 and 32 and sliding members 31 and 32 slide in synchronization in mutually opposite directions, small-diameter disk DS can be inserted along central line O without the sliding of sliding members 31 and 32 being restricted by the restriction of rotation of rotating member 34.

A case where a large-diameter disk DL is inserted in a manner that is biased to the left side shall now be described with reference to FIGS. 9 and 10 and FIGS. 13 and 14.

Figure 9:
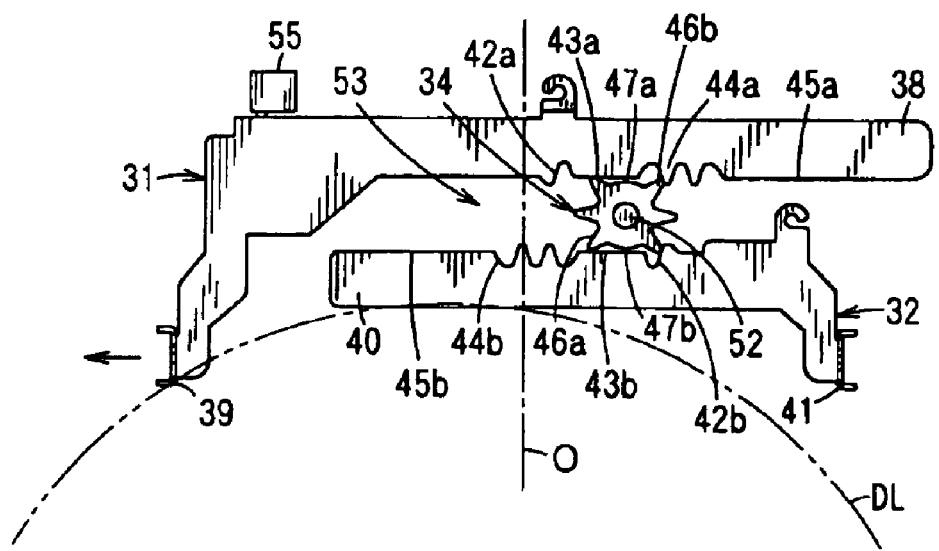
FIG. 9 is an explanatory diagram for explaining the actions when a large-diameter disk is inserted in a manner that is biased to the left side in the same disk insertion position setting device.

When large-diameter disk DL is inserted in a manner that is biased to the left side of FIG. 1, the left peripheral side of large-diameter disk DL contacts disk contacting part 39 of first sliding member 31 and pushes and causes first sliding member 31 to slide in the left direction as shown in FIG. 9.

By the sliding of first sliding member 31 in the left direction of FIG. 1, rotating member 34, with which one gear part 46a engages with first rack part 42a of first sliding member 31, rotates in the counterclockwise direction so that rotation restricting part 43a opposes notched part 47a, and by the counterclockwise rotation of rotating member 34, second sliding member 32, the first rack part 42b of which engages with the other gear part 46b, slides in a linked manner in the right direction so that rotation restricting part 43b opposes notched part 47b.

In the condition where rotation restricting parts 43a and 43b oppose notched parts 47a and 47b as shown in FIG. 9, first sliding member 31 slides further in the left direction and second rack part 44a contacts the other gear part 46b of rotating member 34 and tends to rotate rotating member 34 in the counterclockwise direction. However, the one gear part 46a that has disengaged from first rack part 42a of first sliding member 31 contacts rotation restricting part 43b of second sliding member 32 and restricts the rotation of rotating member 34 in the counterclockwise direction. The sliding of first sliding member 31 in the left direction is thus restricted.

After the sliding of first sliding member 31 in the left direction has been restricted in the condition shown in FIG. 9, the insertion of large-diameter disk DL is shifted to the right, that is, towards central line O.

Figure 10:
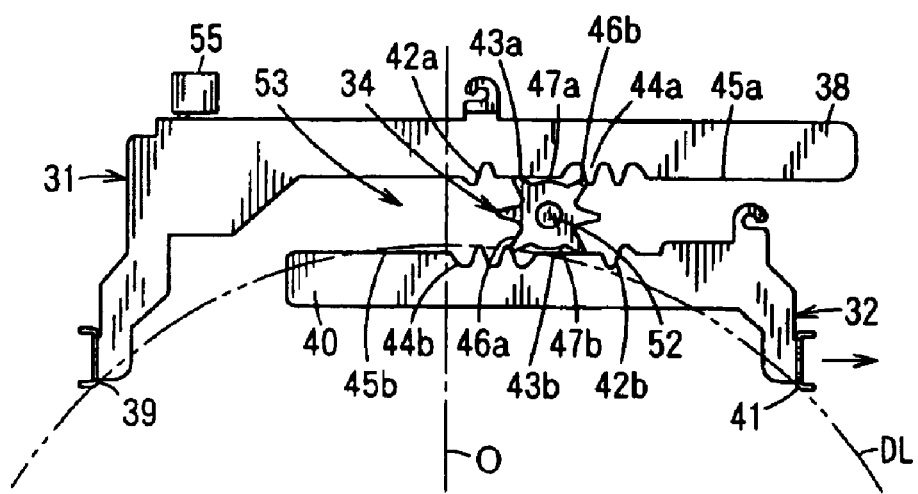
FIG. 10 is an explanatory diagram that follows after FIG. 9.

As shown in FIG. 10, when large-diameter disk DL is thus inserted with it being shifted towards central line O, the right peripheral side of large-diameter disk DL contacts disk contacting part 41 of second sliding member 32 and pushes and causes second sliding member 32 to slide in the right direction. Large-diameter disk DL is thus aligned along central line O.

Figure 13:
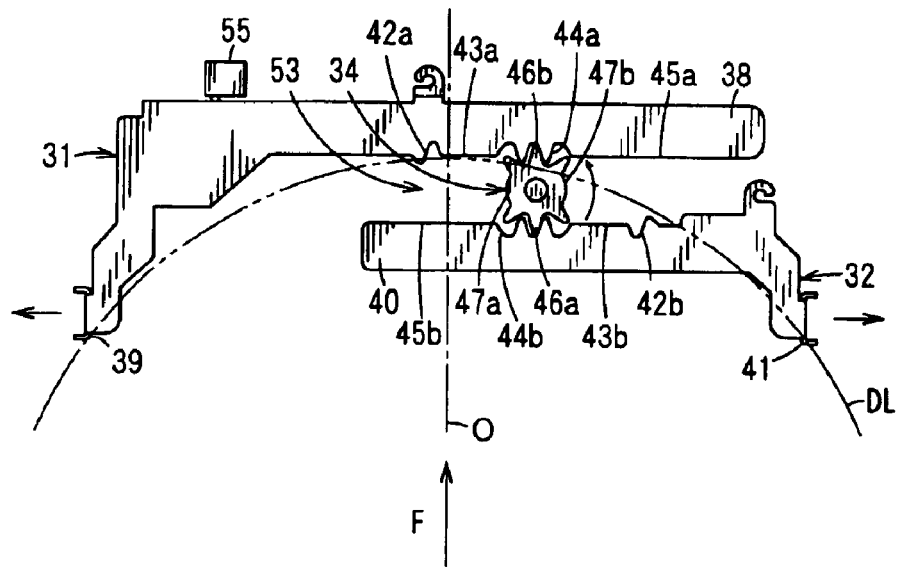
FIG. 13 is an explanatory diagram that follows after FIG. 10 or FIG. 12.

By the sliding of second sliding member 32 in the right direction, rotation restricting part 43b is made to disengage from gear part 46a and the restriction of rotation of rotating member 34 is thereby eliminated. Consequently as shown in FIG. 13, gear part 46b of rotating member 34 engages with second rack part 44a of first sliding member 31, gear part 46a of rotating member 34 engages with second rack part 44b of second sliding member 32, and rotating member 34 rotates in the counterclockwise direction. The sliding of first sliding member 31 in the left direction and the sliding of second sliding member 32 in the right direction about rotating member 34 as the center are thus synchronized and large diameter disk DL is thus inserted along central line O.

With large-diameter disk DL being aligned along central line O, the front end in the insertion direction of large-diameter disk DL becomes sandwiched between top guide 26 and loading roller 27. When first sliding member 31 slides in the left direction, insertion detection switch 55 turns on, and since loading roller 27 is driven to rotate, large-diameter disk DL is loaded onto a predetermined reproduction position inside main body 10 by this rotation of loading roller 27. Furthermore in the case of large-diameter disk DL, since the amount of sliding of first sliding member 31 in the left direction is greater than that in the case of small-diameter disk DS, disk type detection switch 56 turns on and the disk is thereby identified as being large-diameter disk DL.

Figure 14:
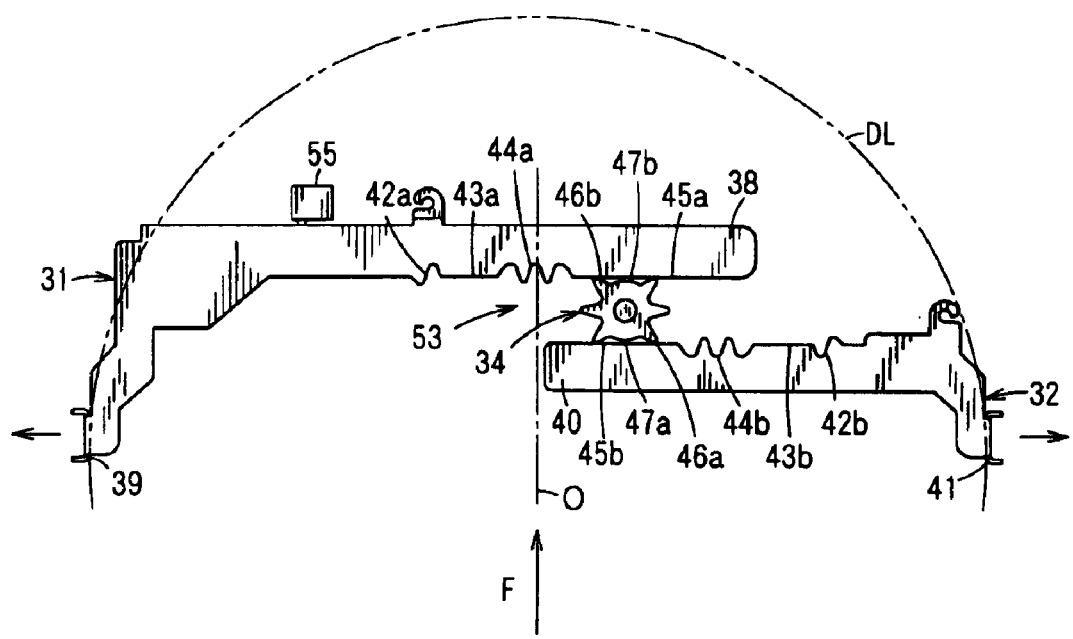
FIG. 14 is an explanatory diagram that follows after FIG. 13.

In the process of loading large-diameter disk DL, rotation restricting part 45a of first sliding member 31 opposes notched part 47b and rotation restricting part 45b of second sliding part 32 opposes notched part 47a as shown in FIG. 14 so that sliding members 31 and 32 become disengaged from rotating member 34. When the maximum diameter part of large-diameter disk DL has passed between disk contacting parts 39 and 41, sliding members 31 and 32 are urged by spring 33 to slide so as to narrow the interval between disk contacting parts 39 and 41, and sliding members 31 and 32 slide in synchronization due to the engagement of gear parts 46a and 46b of rotating member 34 with rack parts 44a, 44b, 42a and 42b, and the initial condition shown in FIG. 1 is thereby restored.

A case where large-diameter disk DL is inserted in a manner that is biased to the right side shall now be described with reference to FIGS. 11 and 12.

When large-diameter disk DL is inserted in a manner that is biased to the right side of. FIG. 1, the right peripheral side of large-diameter disk DL contacts disk contacting part 41 of second sliding member 32 and pushes and causes second sliding member 32 to slide in the right direction as shown in FIG. 11.

By the sliding of second sliding member 32 in the right direction of FIG. 1, rotating member 34, with which one gear part 46b engages with first rack part 42b of second sliding member 32, rotates in the counterclockwise direction so that rotation restricting part 43b opposes notched part 47b, and by the counterclockwise rotation of rotating member 34, first sliding member 31, the first rack part 42a of which engages with the other gear part 46a, slides in a linked manner in the left direction so that rotation restricting part 43a opposes notched part 47a.

Figure 11:
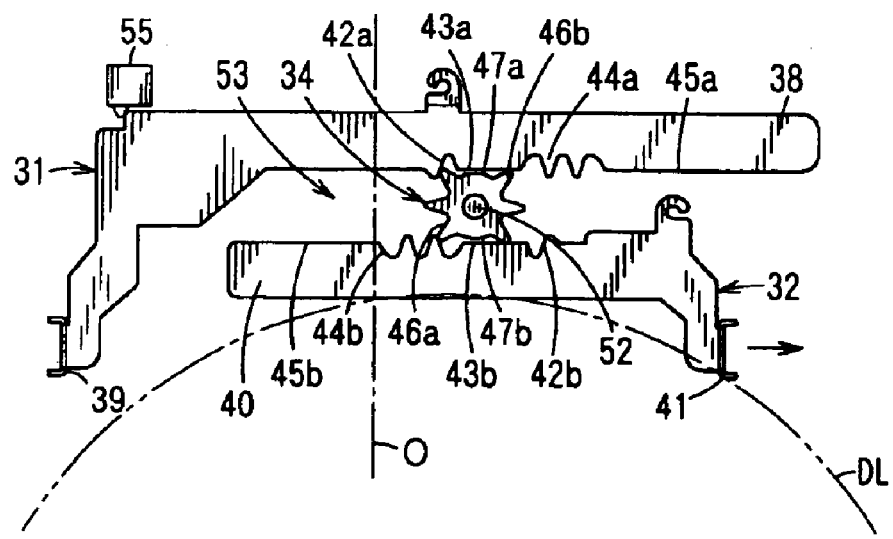
FIG. 11 is an explanatory diagram for explaining the actions when a large-diameter disk is inserted in a manner that is biased to the right side in the same disk insertion position setting device.

In the condition where rotation restricting parts 43a and 43b oppose notched parts 47a and 47b as shown in FIG. 11, second sliding member 32 slides further in the right direction and second rack part 44b contacts the other gear part 46a of rotating member 34 and tends to rotate rotating member 34 in the counterclockwise direction. However, the one gear part 46b that has disengaged from first rack part 42b of second sliding member 32 contacts rotation restricting part 43a of first sliding member 31 and restricts the rotation of rotating member 34 in the counterclockwise direction. The sliding of second sliding member 32 in the right direction is thus restricted.

After the sliding of second sliding member 32 in the right direction has been restricted in the condition shown in FIG. 11, the insertion of large-diameter disk DL is shifted to the left, that is, towards central line O.

Figure 12:
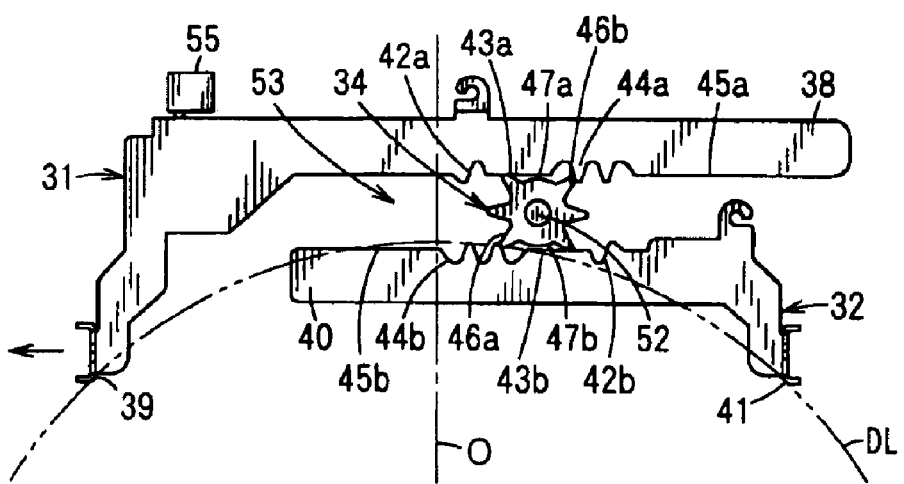
FIG. 12 is an explanatory diagram that follows after FIG. 11.

As shown in FIG. 12, when large-diameter disk DL is thus inserted with it being shifted towards central line O, the left peripheral side of large-diameter disk DL contacts disk contacting part 39 of first sliding member 31 and pushes and causes first sliding member 31 to slide in the left direction and large-diameter disk DL is thus aligned along central line O.

By the sliding of first sliding member 31 in the left direction, rotation restricting part 43a is disengaged from gear part 46b and the restriction of rotation of rotating member 34 is thereby eliminated.

The subsequent actions are the same as those in the case where large-diameter disk DL is inserted in a manner that is biased to the left.

Also, in the case where large-diameter disk DL is inserted along central line O, since the peripheral sides of large-diameter disk DL contact both disk contacting parts 39 and 41 of sliding members 31 and 32 and sliding members 31 and 32 slide in synchronization in mutually opposite directions, large-diameter disk DL can be inserted along central line O without the sliding of sliding members 31 and 32 being restricted by the restriction of rotation of rotating member 34.

In the process of ejection of small-diameter disk DS or large-diameter disk DL, since the peripheral edges of disk DS or DL, which is unloaded by the driving of loading roller 27, contact disk contacting parts 39 and 41 of sliding members 31 and 32 and sliding members 31 and 32 slide in synchronization in mutually opposite directions, disk DS or DL can be ejected along central line O without the sliding of sliding members 31 and 32 being restricted by the restriction of rotation of rotating member 34.

Since a disk can be positioned so that it is inserted along central line O of disk insertion direction F by thus disposing in parallel sliding parts 38 and 40 of sliding members 31 and 32, which slide in directions that intersect central line O of disk insertion direction F, and providing, between sliding parts 38 and 40, a rotating member 34, which allows the sliding of sliding members 31 and 32 in synchronization in mutually opposite directions and restricts the sliding of just one of either sliding member 31 or 32 alone, the number of parts can be made small and the arrangement can be made simple and compact.

Furthermore, by just providing sliding parts 31 and 32 with first rack parts 42a and 42b, rotation restricting parts 43a and 43b, and second rack parts 44a and 44b and providing rotating member 34 with gear parts 46a and 46b and notched parts 47a and 47b, the rotation of rotating member 34 is allowed by the disengaging of gear parts 46a and 46b from first rack parts 42a and 42b, the opposing of notched parts 47a and 47b to rotation restricting parts 43a and 43b, and the engagement of gear parts 46a and 46b with second rack parts 44a and 44b when sliding members 31 and 32 slide in synchronization in mutually opposite directions, and when, for example, just first sliding member 31 slides, the rotation of rotating member 34 can be restricted by the contacting of gear part 46a, which has become disengaged from first rack part 42a of first sliding member 31, with rotation restricting part 43b of second sliding member 32 and the sliding of first sliding member 31 can be restricted by the contacting of gear part 46b, which has become disengaged from first rack part 42b of second sliding member 32, with second rack part 44a of first sliding member 31. Positioning of a disk so that it will be inserted along central line O of disk insertion direction F is thus enabled by a simple arrangement.

Also, since the length of each of rotation restricting parts 43a and 43b between first rack parts 42a and 42b and second rack parts 44a and 44b is longer than the length of each of the notched parts 47a and 47b from one gear part 46a of rotating member 34 to the other gear part 46b, when, for example, just the first sliding member 31 at one side slides, gear part 46a, which has become disengaged from first rack part 42a of the first sliding member 31 at the one side, contacts rotation restriction part 43b of second sliding member 32 at the other side without fail, thereby enabling the rotation of rotating member 34 to be restricted and the sliding of just first sliding member 31 at the one side to be restricted.

Restriction means 53 is not restricted to the arrangement of first rack parts 42a and 42b, rotation restriction parts 43a and 43b, and second rack parts 44a and 44b, provided on sliding members 31 and 32, and rotating member 34, having gear parts 46a and 46b and notched parts 47a and 47b, and any arrangement, which, when a disk is inserted along central line O, allows the synchronous spreading movement with respect to central line O of disk contacting parts 39 and 41 of sliding members 31 and 32 and which, when a disk is inserted in a manner that is biased towards either side of central line O, restricts the spreading movement of the disk contacting part 39 or 41 at the side towards which the disk is biased and thereby sets the disk along central line O, may be employed.

Also, the disks to be handled by disk insertion position setting device 30 are not limited to compact disks specialized for music reproduction and the invention may be applied to and can provide the same actions and effects with other optical disks, magneto-optical disks, flexible magnetic disks, etc. Also, the driving device to which disk insertion position setting device 30 is applied is not limited to a disk player, and the invention may be applied to and can provide the same actions and effects with disk recording and reproduction devices that can record onto a disk.

With the disk insertion position setting device of the embodiment, since a disk can be positioned so as to be inserted along the central line of the disk insertion direction by the use of first and second sliding members that slide in directions intersecting the central line of the disk insertion direction, the device can be made compact.

With the disk insertion position setting device of the embodiment, since a disk can be positioned so as to be inserted along the central line of the disk insertion direction by disposing in parallel the sliding parts of first and second sliding members, which slide in directions intersecting the central line of the disk insertion direction, and by providing, between these sliding parts, a rotating member that allows the sliding of the first and second sliding members in synchronization in mutually opposite directions and restricts the sliding of just one of the sliding members alone, the device can be made few in the number of parts, simple in arrangement, and compact.

With the disk insertion position setting device of the embodiment, in addition to the effects of the disk insertion position setting device of the second aspect of the invention, in the case where the first and second sliding members slide in synchronization in mutually opposite directions, since the respective rack parts engage with the respective gear parts of the rotating member when the rotating member is at a rotation position at which the respective rotation restricting parts of the respective sliding members face the respective notched parts of the rotating member, the rotating member rotates and the respective sliding members slide together. Meanwhile, in the case where just one of the sliding members slides, even if the rack part of the one sliding member that slides engages with the gear part of the rotating member when the rotating member is at a rotation position at which the respective rotation restricting parts face the respective notched parts, the rotation of the rotating member is restricted by the rotation restricting part of the other sliding member that does not slide, thereby restricting the sliding of the one sliding member. A disk can thus be positioned so that it will be inserted along the central line of the disk insertion direction by a simple arrangement.

With the disk insertion position setting device of the embodiment, in addition to the effects of the disk insertion position setting device of the third aspect of the invention, by just providing the first and second sliding members with first rack parts, rotation restriction parts, and second rack parts and the rotating member with gear parts and notched parts, the rotation of the rotating member, in the process of which the respective gear parts of the rotating member become disengaged from the respective first rack parts, the respective notched parts face the respective rotation restricting parts, and the respective gear parts engage with the respective second rack parts, is allowed when the first and second sliding members slide in synchronization in mutually opposite directions. Meanwhile, when just one of the sliding members slides, the gear part that has disengaged from the first rack part of the one sliding member contacts the rotation restricting part of the other sliding member, thereby restricting the rotation of the rotating member and the gear part that has disengaged from the first rack part of the other sliding member contacts the second rack part of the one sliding member, thereby restricting the sliding of the one sliding member. A disk can thus be positioned so that it will be inserted along the central line of the disk insertion direction by a simple arrangement.

With the disk insertion position setting device of the embodiment, in addition to the effects of the disk insertion position setting device of the third or fourth aspect of the invention, since the length of the rotation restricting part between the first rack part and the second rack part is set longer than the length of the notched part from one gear part to the other gear part of the rotating member, when just one of the sliding member slides, the gear part that has disengaged from the first rack part of the one sliding member contacts the rotation restricting part of the other sliding member without fail, and the rotation of the rotating member and the sliding of just the one sliding member can thereby be restricted.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disk insertion, biasing and alignment apparatus comprising:

a first sliding member, slidable in directions intersecting a central line of a disk insertion direction and having, at one side with respect to said central line, a disk contacting part contacting one peripheral side of a disk that is inserted in the disk insertion direction;

a second sliding member, slidable in directions intersecting the central line of said disk insertion direction and having, at the other side with respect to said central line, a disk contacting part contacting the other peripheral side of the disk that is inserted in the disk insertion direction;

an urging means, urging said first and second sliding members in directions in which the respective disk contacting parts approach said central line; and a restricting means, having a plurality of rotation restricting parts and rack parts, positioned alternatingly at each of the first and second sliding members, and a rotating member, having a gear part engageable with the respective rack parts of the respective sliding members, positioned rotatably between the first and second sliding member, being arranged so that when the inserted disk is aligned along said central line, the gear part of the rotating member engages with the respective rack parts of the first and second sliding members, thereby making the rotating member rotate and the first and second sliding members slide synchronously in mutually opposite directions, and being arranged so that when the inserted disk becomes biased towards one side of said central line and just the disk contacting part of the one sliding member at the biased side is pushed by the disk and made to slide, the rotation of the rotating member is restricted by the contacting of the gear part of the rotating member with the rotation restricting part of the other sliding member, thereby restricting further sliding of the disk contacting part at the one side and aligning the disk along the central line and so that by the pushing and sliding of the disk contacting part at the other side by the disk that has been aligned along the central line, the contacting of the gear part of the rotating member with the rotation restricting part of the sliding member at the other side is released, thereby causing the gear part of the rotating member to engage with the respective rack parts of the first and second sliding members and the first and second sliding members to slide to enable the disk to be inserted along the central line.

2. The disk insertion, biasing and alignment apparatus according to claim 1, wherein the restricting means has
   a pair of gear parts and a pair of notched parts are provided on the circumferential face of the rotating member; and
   a first rack part, a rotation restricting part, and a second rack part, disposed in that order along each of the mutually opposing edge parts of the respective sliding parts of the first and second sliding members and positioned at each of the first sliding member and the second sliding member in a point symmetrical positional relationship centered about the rotating member, the interval across which the rotation restricting parts oppose each other being set narrower than the outer diameter of the pair of gear parts on the rotating member and yet wider than the interval of the pair of notched parts, the sliding of the respective sliding members being synchronized at rotation positions of the rotating member at which the respective rack parts engage with the respective gear parts, and the rotation of the rotating member being restricted and the sliding of the respective sliding members being allowed at rotation positions of the rotating member at which the respective rotation restricting parts oppose the respective notched parts.

3. The disk insertion, biasing and alignment apparatus according to claim 2,
   wherein when a disk is not in contact with the respective disk contacting parts, the respective gear parts of the rotating member engage with the respective first rack parts, and
   wherein when said first and second sliding members slide in synchronization in mutually opposite directions, the rotation of the rotating member is allowed, in the process of which the respective gear parts disengage from the respective first rack parts, the respective notched parts oppose the respective rotation restricting parts, and the respective gear parts engage with the respective second rack parts, and
   wherein when just one of the sliding members slides, the gear part that disengages from the first rack of the one sliding member contacts the rotation restricting part of the other sliding member to restrict the rotation of the rotating member and the gear part that disengages from the first rack part of the other sliding member contacts the second rack part of the one sliding member to restrict the sliding of the one sliding member.

4. The disk insertion position setting device according to claim 2, wherein
   the length of the rotation restricting part between the first rack part and the second rack part is set longer than the length of the notched part from one gear part to the other gear part of the rotating member.

5. The disk insertion position setting device according to claim 1, wherein
   the urging means is a spring the intermediate part of which is wounded in a coil-like form, has the respective end parts respectively connected to the first and second sliding members, and urges the first and second sliding members in directions in which the respective disk contacting parts approach the central line.

6. The disk insertion, biasing and alignment apparatus comprising:
   a first sliding member, slidable in directions intersecting a central line of a disk insertion direction and having, at one side with respect to said central line, a disk contacting part contacting one peripheral side of a disk that is inserted in the disk insertion direction;
   a second sliding member, slidable in directions intersecting the central line of said disk insertion direction and having, at the other side with respect to said central line, a disk contacting part contacting the other peripheral side of the disk that is inserted in the disk insertion direction;
   an urging means, urging said first and second sliding members in directions in which the respective disk contacting parts approach said central line; and
   a restricting means, having a plurality of rotation restricting parts and rack parts, positioned alternatingly at each of the first and second sliding members, and with a rotating member, having a gear part engageable with the respective rack parts of the respective sliding members, positioned rotatably between the first and second sliding member,
   being arranged so that when the inserted disk is aligned along said central line, the gear part of the rotating member engages with the respective rack parts of the first and second sliding members, thereby making the rotating member rotate and the first and second sliding members slide synchronously in mutually opposite directions, and
   being arranged so that when the inserted disk becomes biased towards one side of said central line and just the disk contacting part of the one sliding member at the biased side is pushed by the disk and made to slide, the rotation of the rotating member is restricted by the contacting of the gear part of the rotating member with the rotation restricting part of the other sliding member, thereby restricting further sliding of the disk contacting part at the one side and aligning the disk along the central line and so that, until this disk is aligned along the central line, the disk contacting part of the other sliding member at the side opposite the biased side is pushed by the disk and made to slide to enable the disk to be inserted alone the central line.

7. The disk insertion position setting device according to claim 6, having a case wherein
   the first and second sliding members are slidably provided and the rotating member is rotatably provided.

8. The disk insertion position setting device according to claim 7, wherein
   a plurality of guide protrusions are formed on the first and second sliding members and protrude therefrom; and a plurality of guide grooves, which slidably engage with each guide protrusion of the first and second sliding members, are provided in the case.

9. A disk insertion, biasing and alignment apparatus comprising:

a first sliding member, having a sliding part, slidable in directions intersecting a central line of a disk insertion direction, and a disk contacting part, being provided at one side of this sliding part and contacting one peripheral side of a disk that is inserted in the disk insertion direction;

a second sliding member, having a sliding part, slidable parallel to the sliding part of the first sliding member and in directions intersecting the central line of said disk insertion direction, and a disk contacting part, being provided at the other side of this sliding part and contacting the other peripheral side of the disk that is inserted in the disk insertion direction;

an urging means, urging said first and second sliding members in directions in which the respective disk contacting parts approach said central line; and a restricting means, having a rotation restricting part and a rack part, positioned at the sliding part of each of the first and second sliding members, and a rotating member, having a gear part engageable with each rack part of each sliding member, positioned between the first and second sliding member in a manner enabling rotation in the same plane as the sliding parts, being arranged so that when the inserted disk is aligned along said central line, the gear part of the rotating member engages with the respective rack parts of the first and second sliding members, thereby making the rotating member rotate and the first and second sliding members slide synchronously in mutually opposite directions, and being arranged so that when the inserted disk is biased towards one side of said central line and just the disk contacting part of the one sliding member at the biased side is pushed by the disk, the rotation of the rotating member is restricted by the contacting of the gear part of the rotating member with the rotation restricting part of the other sliding member, thereby restricting further sliding of the disk contacting part at the one side and aligning the disk along the central line, and so that by the pushing and sliding of the disk contacting part at the other side by the disk that has been aligned along the central line, the contacting of the gear part of the rotating member with the rotation restricting part of the sliding member at the other side is released, thereby causing the gear part of the rotating member to engage with the respective rack parts of the first and second sliding members and the first and second sliding members to slide to enable the disk to be inserted along the central line.

* * * * *